US011889599B2

(12) United States Patent
Kim et al.

(10) Patent No.: US 11,889,599 B2
(45) Date of Patent: Jan. 30, 2024

(54) CONSTANT CURRENT DRIVING DEVICE, CURRENT TRIMMING METHOD THEREOF, AND LED DRIVING DEVICE

(71) Applicant: LX Semicon Co., Ltd., Daejeon (KR)

(72) Inventors: Ji Hwan Kim, Daejeon (KR); Jang Su Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/073,549

(22) Filed: Dec. 1, 2022

(65) Prior Publication Data

US 2023/0180363 A1 Jun. 8, 2023

(30) Foreign Application Priority Data

Dec. 3, 2021 (KR) ........................ 10-2021-0171818

(51) Int. Cl.
*H05B 45/30* (2020.01)
*H05B 45/345* (2020.01)

(52) U.S. Cl.
CPC .................................. *H05B 45/345* (2020.01)

(58) Field of Classification Search
CPC ...... H05B 45/00; H05B 45/30; H05B 45/345; H05B 45/397; H05B 47/10
See application file for complete search history.

(56) References Cited

U.S. PATENT DOCUMENTS

2021/0059028 A1* 2/2021 Greenwood ........... H05B 45/35

FOREIGN PATENT DOCUMENTS

JP 2009-198761 A 9/2009
KR 2011-0057456 A 6/2011

* cited by examiner

*Primary Examiner* — Jimmy T Vu
(74) *Attorney, Agent, or Firm* — POLSINELLI PC

(57) ABSTRACT

The present disclosure provides a technology for precisely controlling an LED driving current using fine current trimming data stored in a memory when driving an LED.

20 Claims, 18 Drawing Sheets

CONSTANT CURRENT DRIVING DEVICE, CURRENT TRIMMING METHOD THEREOF, AND LED DRIVING DEVICE

CROSS REFERENCE TO RELATED APPLICATION

This application claims priority to Republic of Korea Patent Application No. 10-2021-0171818, filed on Dec. 3, 2021, which is hereby incorporated by reference in its entirety.

BACKGROUND

1. Field of Technology

The present embodiment relates to a constant current driving device and a current trimming method thereof.

2. Related Technology

A light emitting diode (LED) is a semiconductor device that emits light according to the electroluminescence effect when a voltage is applied in the forward direction. It is used for various purposes because it can generate large light energy with a long lifespan and low power.

LEDs can be used for a variety of purposes. For example, LEDs may be used as a backlight of a liquid crystal display (LCD) device. In this case since the brightness of LEDs used as a backlight are almost linearly proportional to the current flowing through the LEDs, a precise constant current must be supplied to the LEDs in order to obtain constant brightness. On the other hand, non-uniform device characteristics of LEDs and current fluctuation in a boundary region of LED operation restrict supply of a precise constant current.

A nonvolatile memory device is a memory device that retains stored data even when power is cut off unlike a volatile memory device in which stored data is volatilized when power is cut off. Types of non-volatile memory devices include a ROM, a flash memory, a magnetic memory, and the like. Recently, a NAND flash memory having a relatively high speed and a high degree of integration has been widely used.

The discussions in this section are only to provide background information and does not constitute an admission of prior art.

SUMMARY

In view of such circumstances, an object of the present embodiment is to provide technology for supplying a high-precision constant current by trimming an output current based on fine current trimming data stored in a memory.

To accomplish the aforementioned object, one embodiment provides a constant current driving device including a reference current source configured to supply a reference current, a memory configured to store fine current trimming data determined by a difference between a target current and an output current before trimming through a memory access signal, and a current control circuit controlled through a circuit control signal and configured to generate an output current corresponding to the reference current and to supply an output current trimmed based on the fine current trimming data stored in the memory to a channel.

Another embodiment provides a fine current trimming method of a constant current driving device, including a data loading step of loading fine current trimming data stored in a memory to a current control circuit, an output current measurement step of measuring an output current output to a channel based on the fine current trimming data, an output current determination step of determining whether the output current is equal to a target current, and a fine current trimming data writing step of writing fine current trimming data determined by a difference between the target current and the output current in the memory if the output current is not equal to the target current.

DETAILED DESCRIPTION OF EMBODIMENTS

Hereinafter, the present embodiments will be described in detail with reference to exemplary drawings.

Figure 1:
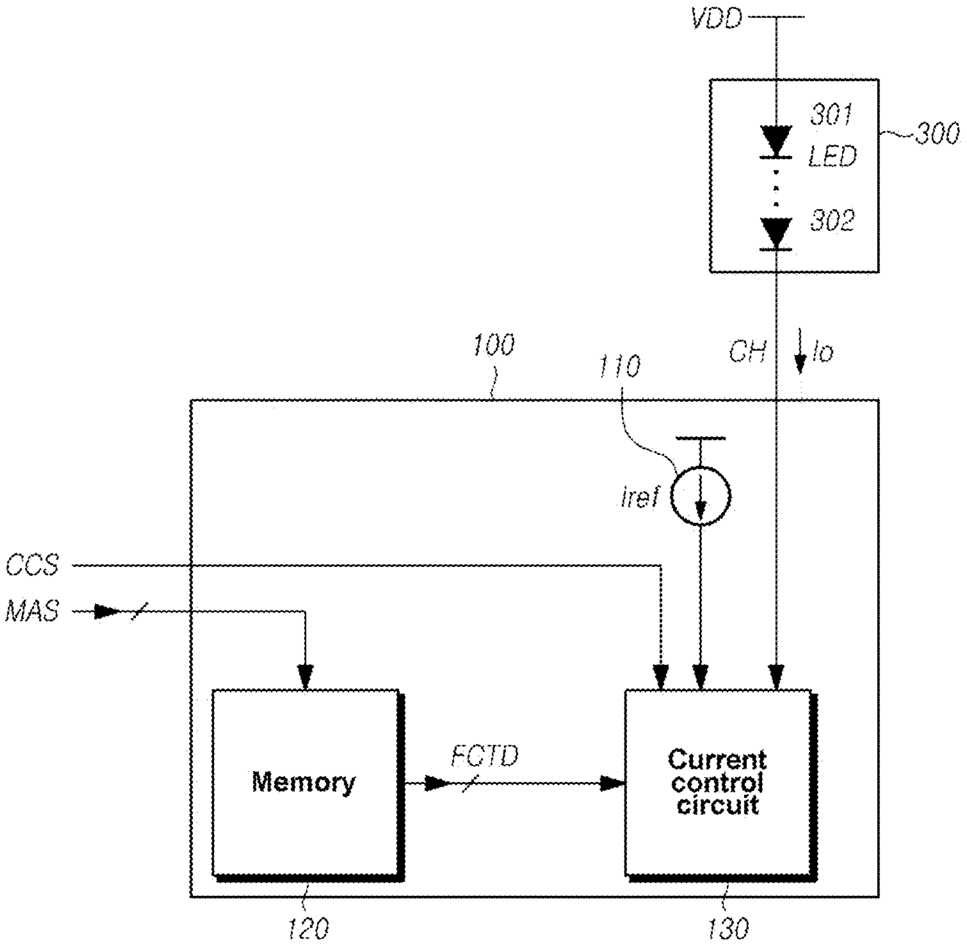
FIG. 1 is a diagram showing a constant current driving device according to an embodiment.

FIG. 1 is a diagram showing a constant current driving device according to an embodiment.

Referring to FIG. 1, the constant current driving device 100 may include a reference current source 110 that supplies a reference current Iref, a memory that stores fine current trimming data FCTD determined by a difference between a target current TI and an output current Io before trimming through a memory access signal MAS, a current control circuit 130 that is controlled by a circuit control signal CCS, generates an output current Io corresponding to the reference current Iref, and supplies the output current Io trimmed based on the fine current trimming data FCTD stored in memory 120 to a channel CH.

The reference current Iref is a reference current for generating the output current Io, and the constant current driving device 100 can generate a high output current Io if the reference current Iref is increased and generate a low output current Io if the reference current Iref is decreased.

The constant current driving device 100 may determine supply power provided to a load 300 by changing the reference current Iref. When the load 300 is a light source element, the constant current driving device 100 may adjust the luminance of the light source element by trimming the reference current Iref.

The memory 120 may store data, for example, fine current trimming data. Memory devices for storing data may be classified into a volatile memory device or a non-volatile memory device. In the volatile memory device, stored data is volatilized when power supply is interrupted. On the other hand, the non-volatile memory device can continue to retain information stored therein even when power supply is interrupted. As the memory 120, a non-volatile memory device such as a ROM, a flash memory, a magnetic memory, or the like may be used.

When the memory 120 is a non-volatile memory device, even if the power of the memory 120 is cut off, data stored in advance can be maintained. Accordingly, when the fine current trimming data FCTD has been stored in the memory 120, even if the memory 120 is powered off, the stored fine current trimming data FCTD may be loaded or newly written when power is applied next time.

The current control circuit 130 may be located in the ground direction of the load 300 to provide the output current Io flowing in the ground direction of the load 300, that is, the current control circuit 130.

The circuit control signal CCS is a signal for operating the current control circuit 130. The output current Io is not supplied before the circuit control signal CCS is applied, and when the circuit control signal CCS is applied, the output current Io can be supplied to the load 300 based on the reference current Iref.

The load 300 may be one or more LEDs 301 and 302. Assuming that the forward voltage of the LEDs 301 and 302 is constant, the amount of driving power to be supplied to the LEDs 301 and 302 may be determined according to the magnitude of a driving current. One sides of the LEDs 301 and 302 may be connected with a driving voltage VDD and the other sides thereof may be connected with the constant current driving device 100.

On the other hand, there are problems that the output current fluctuates according to the real-time operation (on-off operation and the like) of the LEDs 301 and 302 and the trimming accuracy decreases according to offset characteristics of an existing trimming circuit.

The current control circuit 130 can load the fine current trimming data FCTD from the memory 120 despite the device characteristics of the load 300 and trim the output current Io based thereon to provide a high-precision output current Io.

In addition, according to the present embodiment, the constant current driving device 100 loads the fine current trimming data FCTD stored in the memory 120 to trim current and thus can trim the output current irrespective of current fluctuation due to the real-time operation of the above-described LEDs 301 and 302.

Figure 2:
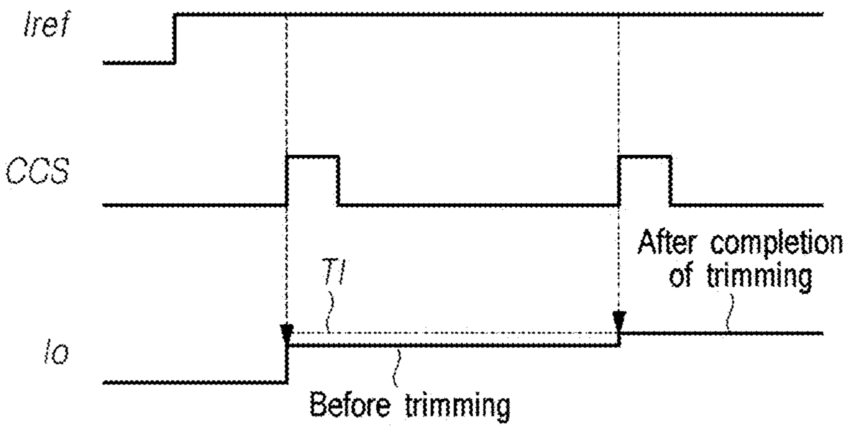
FIG. 2 is a diagram showing an output current according to a reference current and a circuit control signal in FIG. 1.

FIG. 2 is a diagram showing an output current according to the reference current and the circuit control signal in FIG. 1

Referring to FIG. 2, the fine current trimming data FCTD may be determined by a difference between a target current and an output current Io before trimming.

As shown in FIG. 2, even if the reference current Iref is applied to the current control circuit 130, the output current Io is not generated if the circuit control signal CCS is not applied. At this time, when the circuit control signal CCS at a high level is applied, the current control circuit 130 generates the output current Io, and even if the circuit control signal CCS returns to a low level, the output current Io can be maintained.

The target current TI is a current that the constant current driving device 100 intends to provide to the load 300. The current control circuit 130 generates the output current Io using the reference current Iref and the circuit control signal, and the output current Io may be greater or less than the target current due to the real-time operation of the load 300, the characteristics of the load 300, and the device characteristics of the current control circuit 130, and thus the output current Io and the target current may be different from each other.

Therefore, when the fine current trimming data FCTD is set to correspond to the difference between the target current TI and the output current Io before trimming, the current control circuit 130 can generate the output current Io trimmed to be equal to the target current TI based on the fine current trimming data FCTD.

Meanwhile, the output current Io before trimming is less than the target current TI in FIG. 2. Accordingly, the fine current trimming data may be set to correspond to the difference between the output current Io before trimming and the target current TI and then written in the memory 120. The constant current driving device 100 can trim the output current Io based on the fine current trimming data FCTD stored in the memory 120 and provide the output current Io equal to the target current TI to a channel CH.

Figure 3:
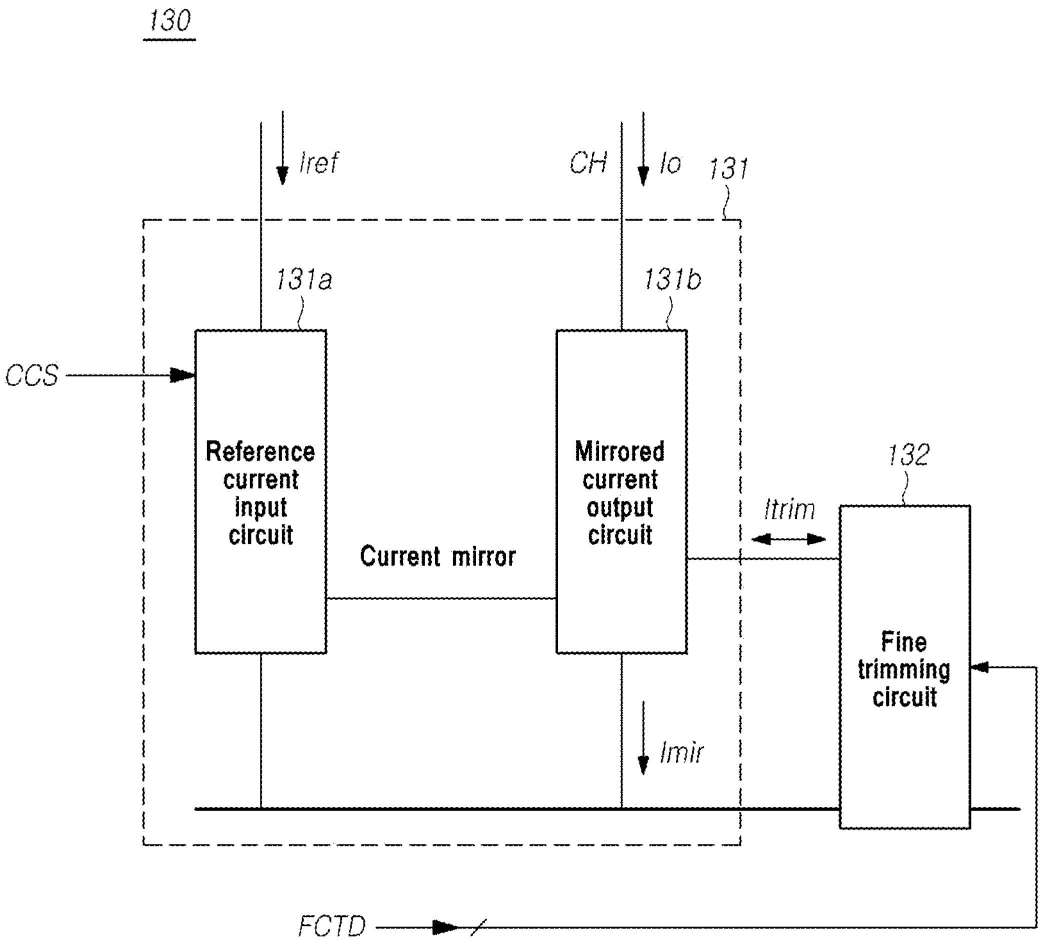
FIG. 3 is a diagram showing a current control circuit of FIG. 1.

FIG. 3 is a diagram showing the current control circuit of FIG. 1.

Referring to FIG. 3, the current control circuit 130 may include a current mirror 131 that receives the reference current Iref and generates a mirroring current Imir, and a fine trimming circuit 132 that trims the mirroring current Imir based on the fine current trimming data received from the memory 120.

A reference current input circuit 131*a* included in the current mirror 131 receives the reference current Iref from the reference current source 110. The reference current input circuit 131*a* transmits information on the reference current Iref to a mirroring current output circuit 131*b*. In this case, the information on the reference current Iref may be transmitted in the form of a voltage. The mirroring current output circuit 131*b* outputs the mirroring current Imir based on the information on the reference current Iref received from the reference current input circuit 131*a*. In this case, the mirroring current Imir may be different from the target current TI due to factors such as device characteristics of the reference current input circuit 131*a* and the mirroring current output circuit 131*b*.

The fine trimming circuit 132 may trim the output current Io based on the fine current trimming data FCTD through various methods.

As an example, the fine trimming circuit 132 may be implemented as a variable resistor. When the output current Io before trimming is less than the target current, the output current Io may be trimmed by changing the resistance value of the variable resistor connected in parallel with the mirroring current output circuit 131*b*. At this time, the sum of the mirroring current Imir generated in the mirroring current output circuit 131*b* and a current Itrim flowing from the mirroring current output circuit 131*b* to the fine trimming circuit 132 is substantially equal to the output current Io. The fine current trimming data FCTD set based on the difference between the mirroring current Imir and the target current TI may have already been stored in the memory 120 through a fine current trimming process. The fine trimming circuit 132 may set the trimming current (Itrim) corresponding to the difference between the output current Io and the mirroring current Imir through the fine current trimming data FCTD stored in the memory 120. This allows the output current Io to match the target current. Meanwhile, the fine trimming circuit 132 is not limited to the above-described variable resistor.

Although FIG. 3 shows an example in which the current control circuit 130 has a sinking structure, the current control circuit may have a sourcing structure. Hereinafter, an example of a current control circuit having a sinking structure will be mainly described for convenience of description.

Figure 4:
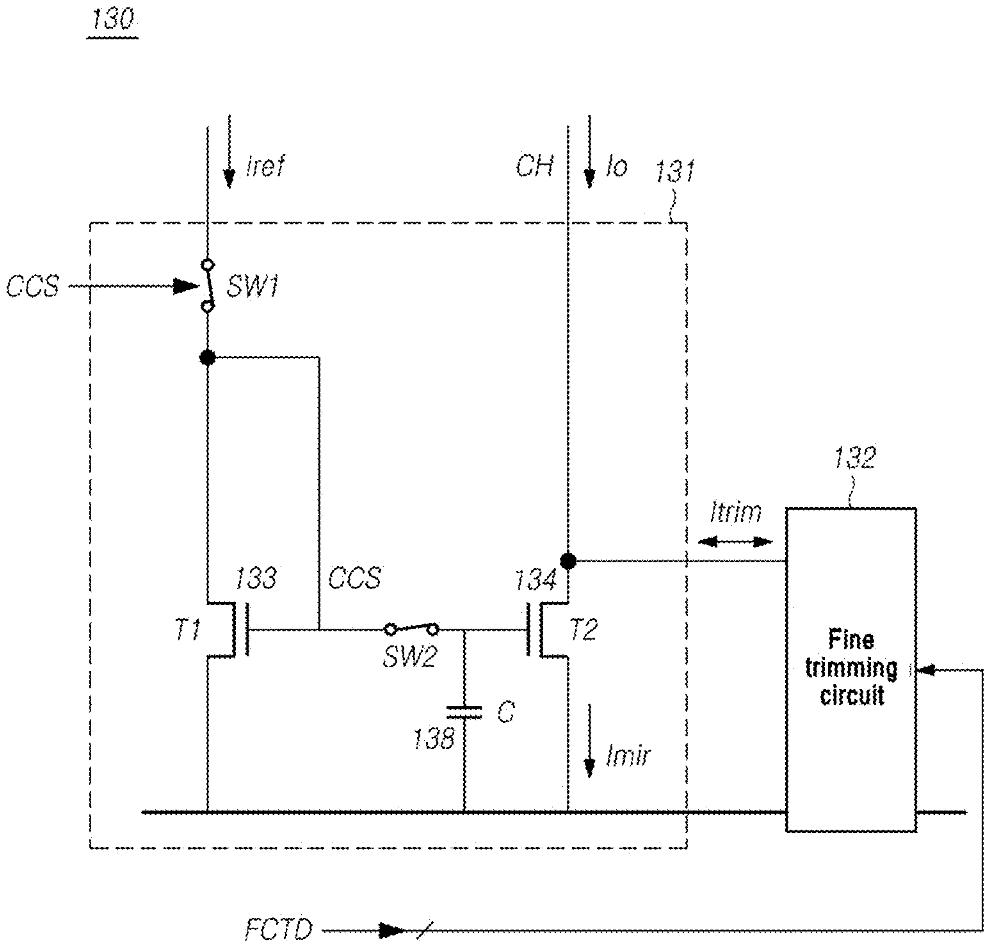
FIG. 4 is a diagram showing an example of a current mirror of FIG. 3.

FIG. 4 is a diagram showing an example of the current mirror of FIG. 3.

Referring to FIG. 4, the current mirror 131 may include a first switch SW1 to which the reference current Iref is applied, a first transistor 133 serially connected to the first switch SW1 and having a gate to which the reference current Iref is applied, a second transistor 134 having a gate connected to the gate of the first transistor 133, a second switch SW2 disposed between the gate of the first transistor 133 and the gate of the second transistor 134, and a capacitor 138 connected between the second switch SW2 and the gate of the second transistor 134.

At this time, the first switch SW1 and the second switch SW2 are switched by the circuit control signal CCS, and the second transistor 134 can supply the output current Io to the channel CH.

Since the sources and gates of the first transistor 133 and the second transistor 134 of the current mirror 131 are connected to the same node, the same gate-source voltage is applied thereto. At this time, the first switch SW1 is turned on through the circuit control signal CCS and thus the reference current Iref is applied to the first transistor 133, thereby generating a gate-source voltage. In this case, the first transistor 133 can operate in a saturation region. Accordingly, the same gate-source voltage as that of the first transistor is generated the second transistor 134 by the reference current Iref and the second transistor 134 also operates in a saturation region, and thus a constant mirroring current Imir flows. Accordingly, an output current Io corresponding to the reference current Iref can be supplied to the channel CH.

The ratio of the reference current Iref to the mirroring current Imir may be determined according to the characteristics of the first transistor 133 and the second transistor 134. If the first transistor 133 and the second transistor 134 have the same characteristics, the reference current Iref and the mirroring current Imir may be identical. Unlike shown in FIG. 4, a plurality of second transistors 134 may be connected in parallel. Through this, the ratio of the reference current Iref to the mirroring current Imir can be set. Such modification is well known in the art.

The second switch SW2 is switched in the same manner as the first switch SW1 by the circuit control signal CCS. When the first switch SW1 and the second switch SW2 are turned on by the circuit control signal CCS, the reference current Iref is applied thereto, the same gate-source voltage is applied to the first transistor 133 and the second transistor 134, and the mirroring current Imir is generated in the second transistor 134. At this time, the capacitor 138 is charged by the reference current Iref.

When the first switch SW1 and the second switch SW2 are turned off by the circuit control signal CCS, the reference current Iref is no longer provided to the first transistor 133, and the current does not flow.

At this time, since the previous gate-source voltage of the second transistor 134 is maintained by the capacitor 138, the mirroring current Imir of the saturation region can be continuously maintained even if the reference current Iref is not applied.

Figure 5:
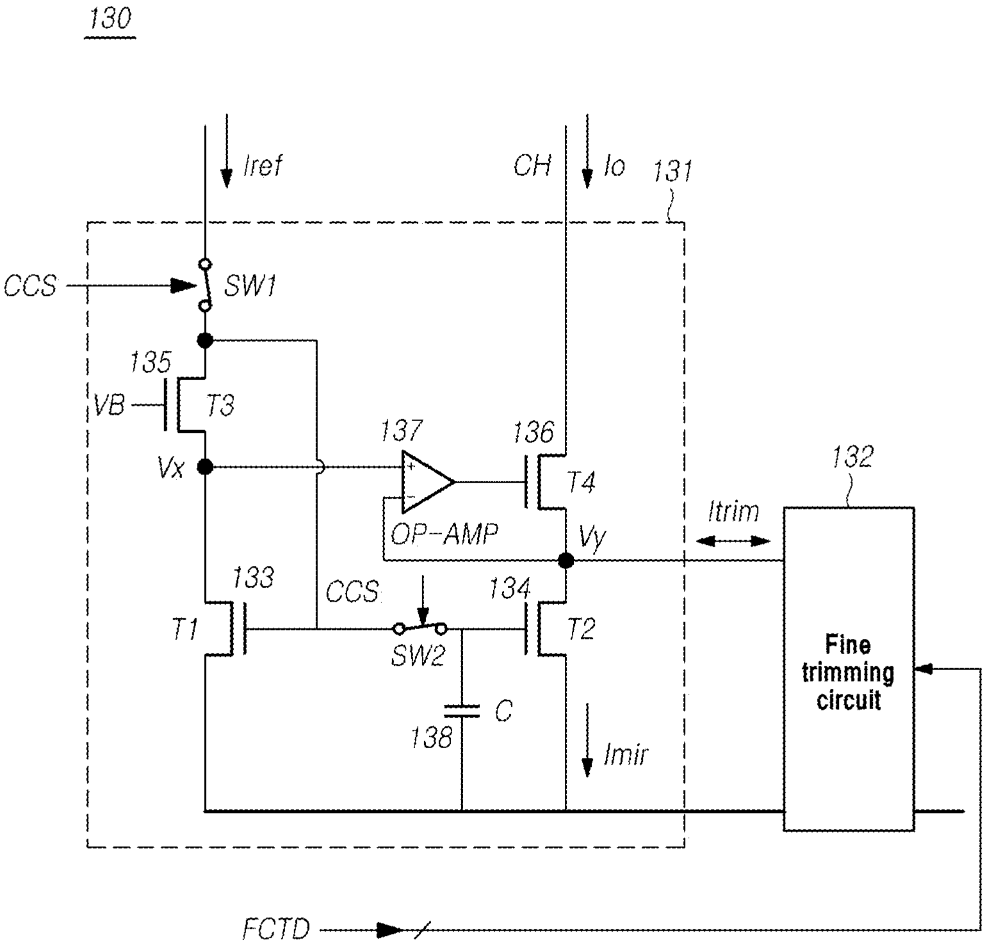
FIG. 5 is a diagram showing another example of the current mirror of FIG. 3.

FIG. 5 is a diagram showing another example of the current mirror of FIG. 3.

Referring to FIG. 5, the current mirror 131 may include a third transistor 135 disposed between the first switch SW1 and the first transistor 133, a fourth transistor 136 serially connected to the second transistor 134 on the side of the channel CH, and an operational amplifier 137 that receives a voltage Vx formed between the first transistor 133 and the third transistor 135 and a voltage Vy formed between the second transistor 134 and the fourth transistor 136 and outputs the voltages Vx and Vy to the gate of the fourth transistor 136. A bias voltage VB may be supplied through a gate of the third transistor 135.

The operational amplifier 137 may receive the voltage Vx as a non-inverted input and the voltage Vy as an inverted input. At this time, the output of the operational amplifier 137 is a value obtained by multiplying the difference Vx−Vy between the two voltages by the gain A of the operational amplifier 137.

At this time, the voltage Vy becomes equal to the voltage Vx due to negative feedback, and thus an error in current mirroring can be reduced. In addition, a high output resistance can be maintained, and thus high load regulation characteristics can be achieved.

Figure 6:
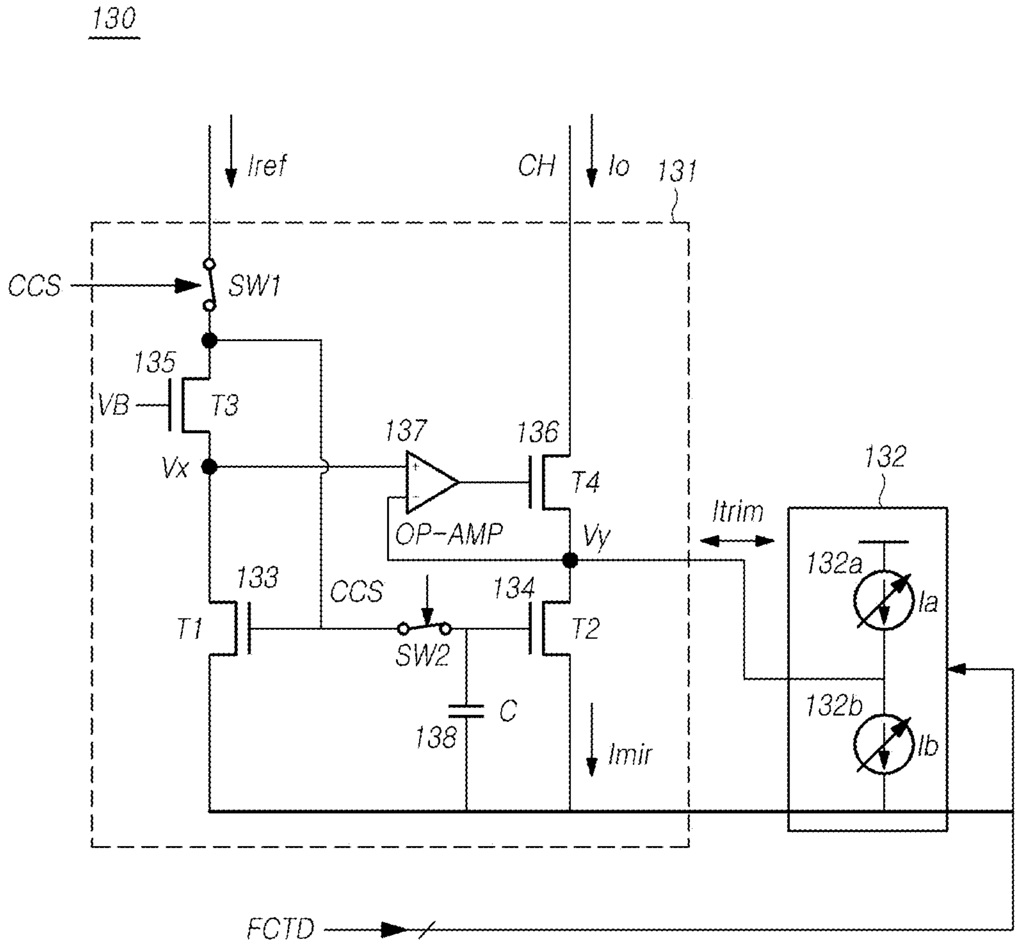
FIG. 6 is a diagram showing a fine trimming circuit of FIG. 3.

FIG. 6 is a diagram showing the fine trimming circuit of FIG. 3.

Referring to FIG. 6, the fine trimming circuit 132 may include a first variable current source 132*a* and a second variable current source 132*b*. At this time, the fine trimming circuit 132 may trim the mirroring current Imir by adjusting the current Ia of the first variable current source 132*a* and the current Ib of the second variable current source 132*b* based on the fine current trimming data FCTD.

The current Itrim flowing into the fine trimming circuit 132 is equal to a value obtained by subtracting the current Ia of the first variable current source 132*a* from the current Ib of the second variable current source 132*b*. Accordingly, the output current Io provided to the channel CH may be trimmed by adjusting the difference between the current Ib and the current Ia.

For example, if the mirroring current Imir is less than the target current TI, the current Ib may be set to be greater than the current Ia by the difference between the mirroring current Imir and the target current TI in order to increase the output current Io. Then, the current Itrim corresponding to the difference flows to the fine trimming circuit 132, and thus the output current Io can be trimmed. In this case, the current Ib of the second variable current source 132*b* may be set to the difference, and the current Ia of the first variable current source 132_a_ may be set to zero.

On the other hand, if the mirroring current Imir is greater than the target current, the current Ib may be set to be less than the current Ia by the difference.

The fine trimming circuit 132 may set the current Ia of the first variable current source 132_a_ and the current Ib of the second variable current source 132_b_ based on the fine current trimming data FCTD and supply a high-precision output current Io substantially equal to the target current TI to the load 300.

Figure 7:
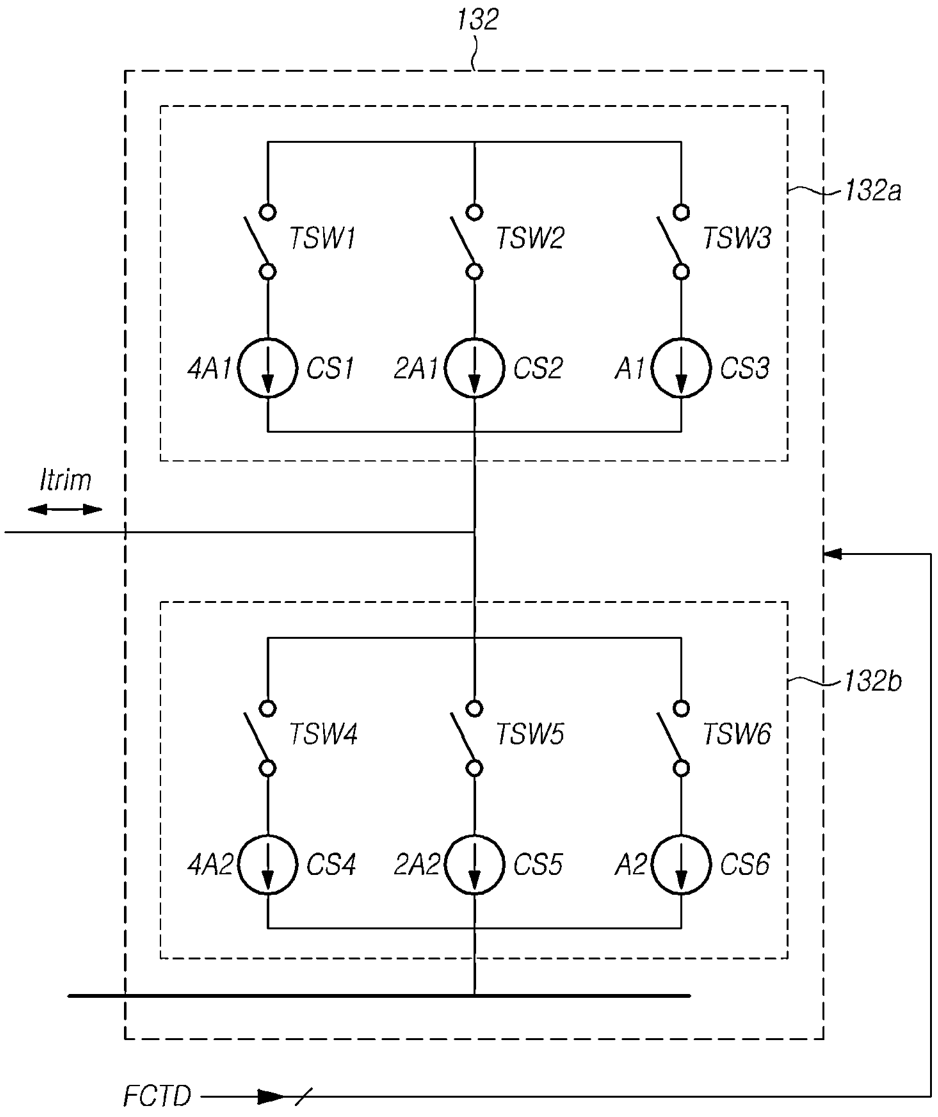
FIG. 7 is a diagram showing an example of the fine trimming circuit of FIG. 6.

FIG. 7 is a diagram showing an example of the fine trimming circuit of FIG. 6.

Referring to FIG. 7, the first variable current source 132_a_ and the second variable current source 132_b_ may be digitally controlled, and the fine current trimming data FCTD may be digital code for controlling the first variable current source 132_a_ and the second variable current source 132_b_.

The first variable current source 132_a_ may include a plurality of current sources CS1, CS2, and CS3 and a plurality of switches TSW1, TSW2, and TSW3 connected thereto for digital control. The current sources CS1, CS2, and CS3 may provide currents 4A1, 2A1 and A1, respectively. At this time, the plurality of switches TSW1, TSW2, and TSW3 respectively connected to the current sources CS1, CS2, and CS3 determine whether the respective current sources supply currents.

For example, the current of 2A1 is output from the first variable current source 132_a_ if only the switch TSW2 is turned on, and the current of 5A1 is output from the first variable current source 132_a_ if only the switch TSW1 and the switch TSW3 are turned on.

Meanwhile, the same may apply to the second variable current source 132_b_.

In the case of the first variable current source 132_a_ of the fine trimming circuit 132 of FIG. 7, all switches TSW1, TSW2, and TSW3 included therein are turned off to provide no current to the current mirror 131, or all or some switches TWS1, TWS2, and TWS3 may be turned on to provide the currents A1 to 7A1 to the current mirror 131. In this case, the output current Io may be decreased by the current set in the first variable current source 132_a_ rather than the mirroring current Imir. The fine trimming circuit 132 may set the current of the second variable current source 132_b_ to 0 or A2 to 7A2 and receive the same from the current mirror. In this case, the output current Io may be increased by the current set in the second variable current source 132_b_ rather than the mirroring current Imir.

At this time, the fine current trimming data FCTD may be digital code for on/off of the switches TSW1, TSW2, TSW3, TSW4, TSW5, and TSW6 of the first variable current source 132_a_ and the second variable current source 132_b_.

The fine trimming circuit 132 may load the fine current trimming data FCTD, which is the digital code for on/off of the switches TSW1, TSW2, TSW3, TSW4, TSW5, and TSW6, from the memory 120 and selectively turn on/off the switches TSW1, TSW2, TSW3, TSW4, TSW5, and TSW6 of the first variable current source 132_a_ and the second variable current source 132_b_ to allow a current required for trimming of the output current Io to flow.

Meanwhile, FIG. 7 shows an example for describing the first variable current source 132_a_ and the second variable current source 132_b_, and the arrangement of the first variable current source 132_a_ and the second variable current source 132_b_, the number of current sources included in each variable current source, the number of switches included in each variable current source, and the current value of each current source are not limited to the example shown in FIG. 7.

Figure 8:
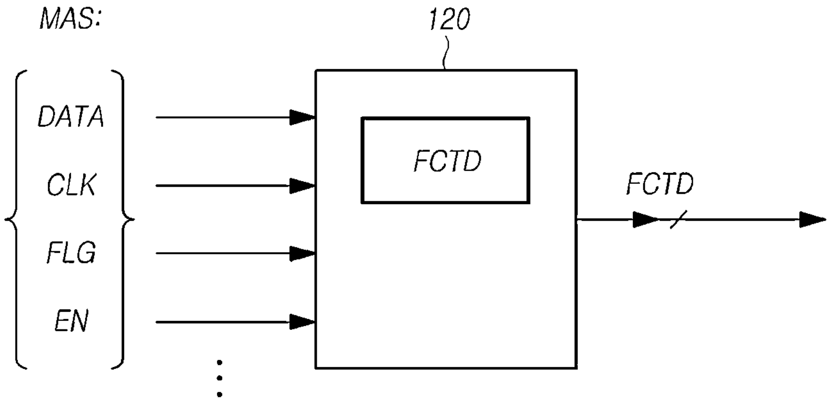
FIG. 8 is a diagram showing a memory, a memory access signal, and fine current trimming data in FIG. 1.
Figure 9:
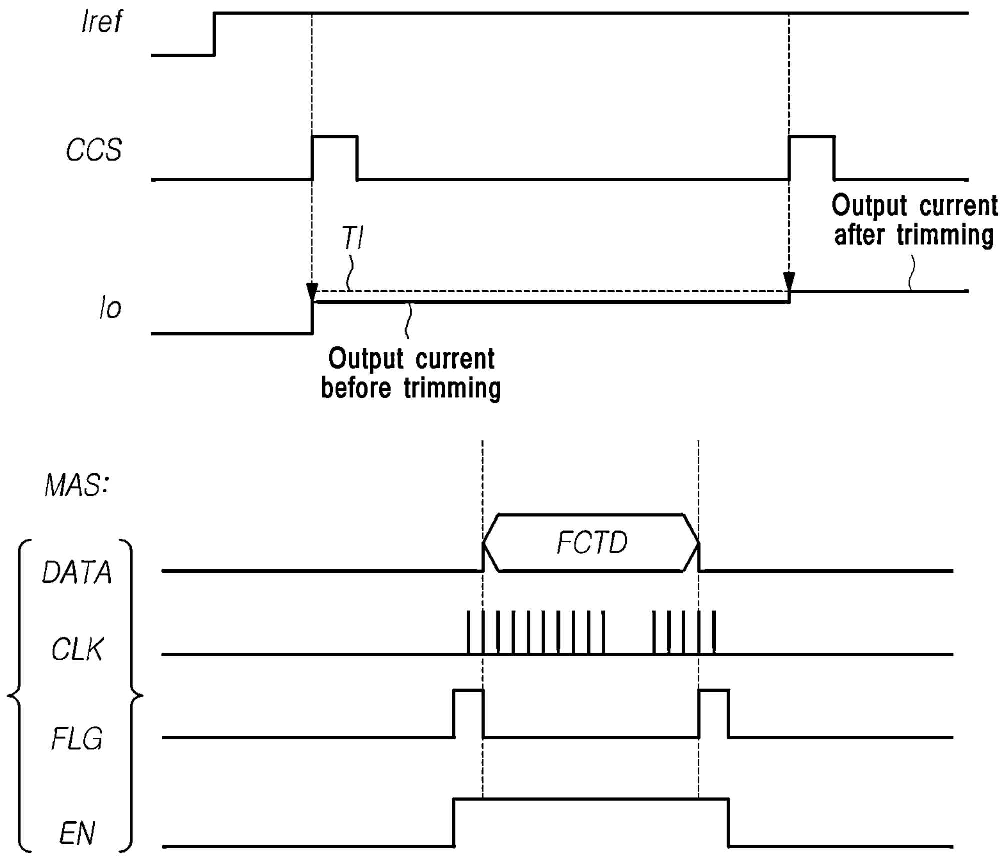
FIG. 9 is a diagram showing an example of the reference current, the circuit control signal, the output current, and a memory access signal in FIG. 1.

FIG. 8 is a diagram showing the memory, the memory access signal, and the fine current trimming data in FIG. 1. FIG. 9 is a diagram showing an example of the reference current, the circuit control signal, the output current, and a memory access signal in FIG. 1.

Referring to FIG. 8, the memory access signal MAS may include a data signal DATA, a clock signal CLK, a flag signal FLG indicating start and end, and a write enable signal EN.

The memory access signal MAS may be determined based on a preset protocol.

The fine current trimming data FCTD can be written in the memory 120 through the data signal DATA, the clock signal CLK, the flag signal FLG, and the write enable signal EN of the memory access signal MAS.

Referring to FIGS. 8 and 9, a current trimming process for the output current Io and a writing process of the fine current trimming data FCTD included in the current trimming process can be ascertained.

In FIG. 9, the output current Io generated in the current control circuit through the circuit control signal CCS. However, since the output current Io at this time is the output current Io before trimming, it may differ from the target current TI. In this case, the fine current trimming data FCTD may be determined based on the difference between the output current Io and the target current TI, as described above.

After the fine current trimming data FCTD is determined, it may be written in the memory 120. At this time, the flag signal FLG and the write enable signal EN simultaneously become high first. The memory 120 may prepare to receive data based on the high flag signal FLG and write enable signal EN.

At this time, the clock signal CLK is provided, and then the data signal DATA is transmitted at a falling edge of the flag signal FLG. The fine current trimming data FCTD may be written in the memory 120 by the data signal DATA and the clock signal CLK according to a preset protocol.

After data writing, data writing through the data signal DATA may be terminated at a rising edge of the flag signal FLG.

Thereafter, the flag signal FLG and the write enable signal EN may become low, and thus memory access may be terminated.

The current control circuit 130 may trim the output current Io based on the fine current trimming data FCTD written in the memory 120 and supply a high-precision constant current to the channel CH.

The data signal DATA, the clock signal CLK, the flag signal FLG, and the write enable signal EN included in the memory access signal MAS provide access to the memory 120 to enable trimming and updating of the fine current trimming data FCTD.

Figure 10:
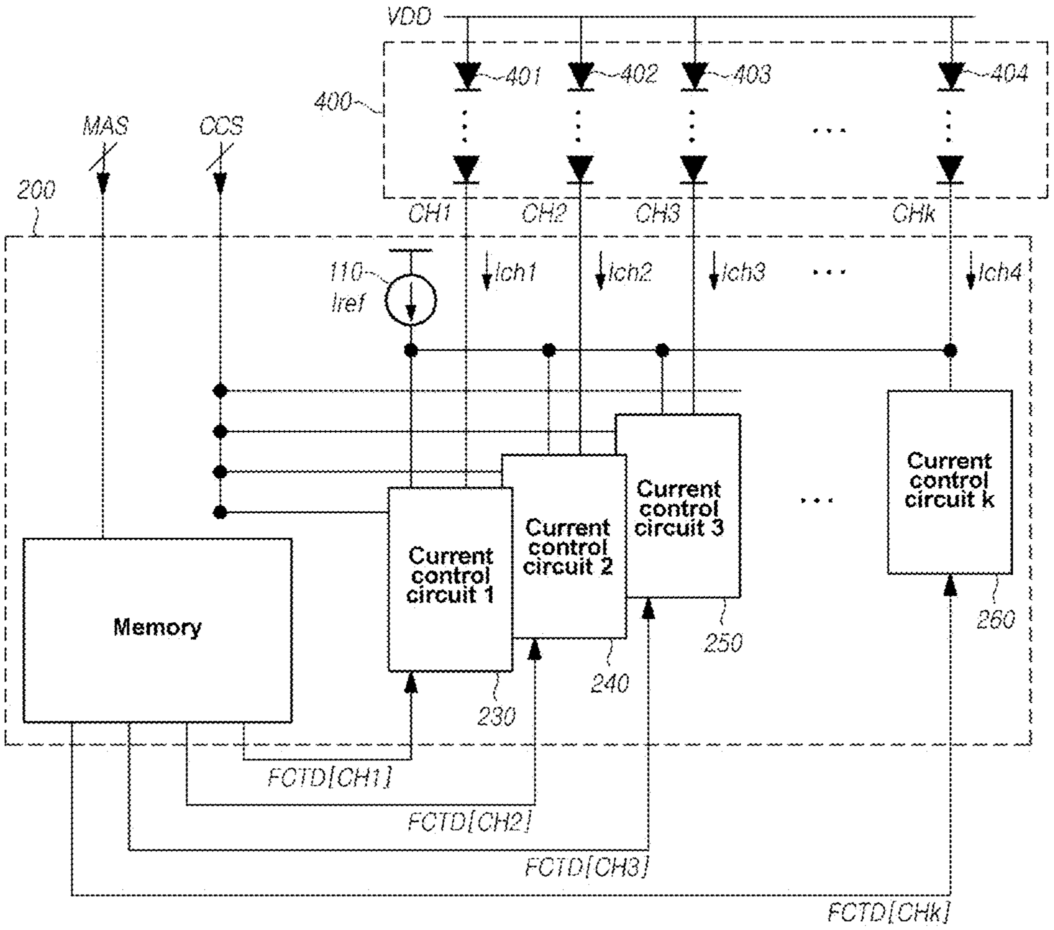
FIG. 10 is a diagram showing another example of the constant current driving device according to an embodiment.

FIG. 10 is a diagram showing another example of a constant current driving device according to an embodiment.

Referring to FIG. 10, the constant current driving device 200 according to another example may include k (k being a natural number equal to or greater than 2) current control circuits 230, 240, 250, . . . , 260 corresponding to k channels. In this case, the memory 120 may store pieces of fine current trimming data FCTD[CH1], FCTD[CH2], FCTD[CH3], . . . , FCTD[CHk] corresponding to the k channels.

The constant current driving device 200 may supply a constant current to the k channels CH1, CH2, CH3, . . . , CHk. The four channels CH1, CH2, CH3, and CHk of FIG. 10 are exemplary, and may be less or more than this.

The k channels CH1, CH2, CH3, . . . , CHk supply currents to a load 400, and each channel may include one or more LEDs. As described above, supplying a high-precision constant current to LEDs is important from the viewpoint of driving power. Assuming that a forward voltage is constant, the same driving current needs to be provided to the channels CH1, CH2, CH3, . . . , CHk in order to apply the same driving power to the plurality of LEDs 401, 402, 403, . . . , 404 corresponding to the k channels CH1, CH2, CH3, . . . , CHk.

At this time, it is required that output currents Ich1, Ich2, Ich3, . . . , Ichk of the channels are identical, and in particular, it is necessary to reduce a current deviation between channels in a low grayscale region.

The same target current TI may be set for the plurality of channels CH1, CH2, CH3, . . . , CHk, and the fine current trimming data FCTD[CH1], FCTD[CH2], FCTD[CH3], . . . , FCTD[CHk] corresponding to the k channels, in which load characteristics of the plurality of channels CH1, CH2, CH3, . . . , CHk and current control circuits 230, 240, 250, and 260 have been reflected, may be loaded from the memory 220 to provide trimmed output currents Ich1, Ich2, Ich3, . . . , Ichk.

Accordingly, it is possible to supply a high-precision constant current equal to the target current to the k channels CH1, CH2, CH3, . . . , CHk.

Figure 11:
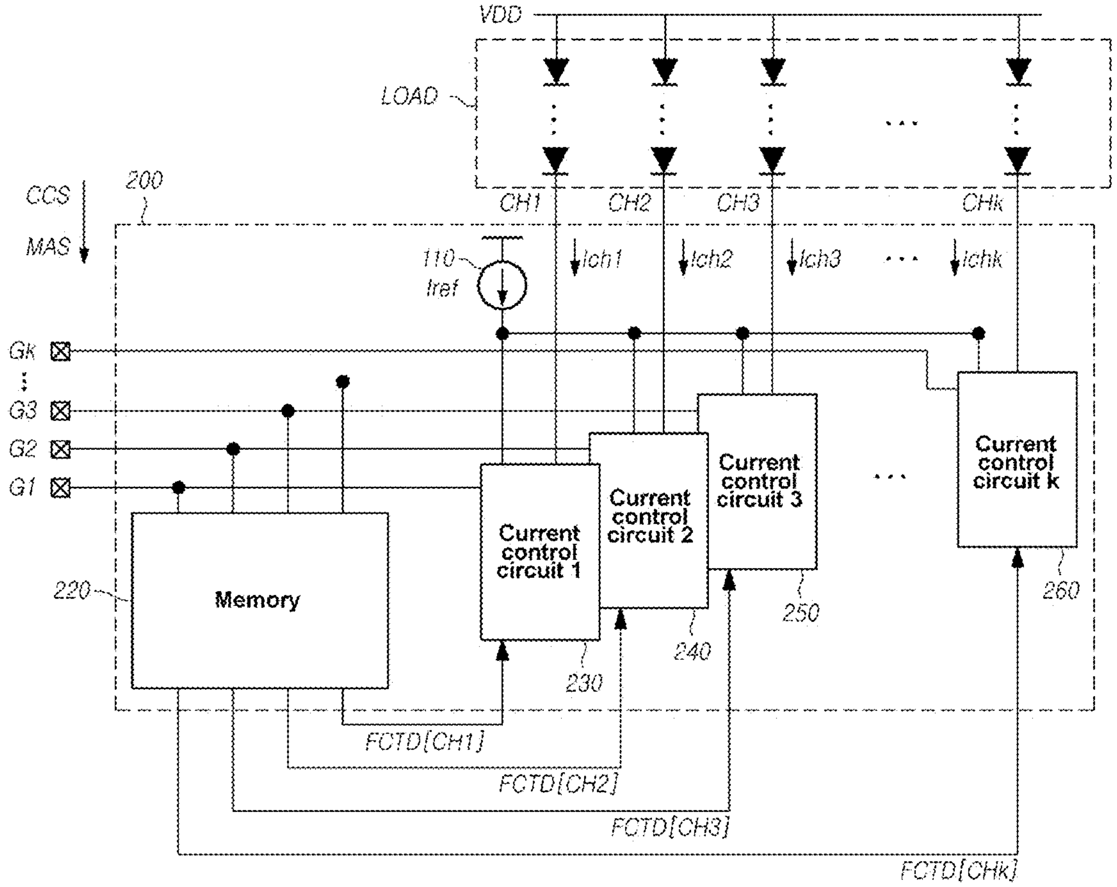
FIG. 11 is a diagram showing common pins to which a memory access signal and a circuit control signal of FIG. 10 are input.

FIG. 11 is a diagram showing common pins to which a memory access signal and a circuit control signal of FIG. 10 are input.

Referring to FIG. 11, the memory access signal MAS and the circuit control signal CCS of the constant current driving device 200 according to another example may be input through all or some of k common pins G1, G2, G3, . . . , Gk corresponding to the k channels CH1, CH2, CH3, . . . , CHk.

The memory access signal MAS requires as many input terminal as the number of inputs necessary to access the memory 220, and the circuit control signal CCS requires any many input terminal as the number of channels of the constant current driving device 200.

In this case, the memory access signal MAS and the circuit control signal CCS may share input terminals.

For example, the memory access signal MAS and the circuit control signal CCS may share all or some of the k common pins G1, G2, G3, . . . , Gk and may be input to the corresponding common pins G1, G2, G3, . . . , Gk to be transmitted to the memory 220 or the current control circuits 230, 240, 250, and 260.

Accordingly, signals input to the memory 220 and the current control circuits 230, 240, 250, and 260 can be received through the common pins G1, G2, G3, . . . , Gk, and thus the circuit layout of the constant current driving device 200 can be simplified.

Figure 12:
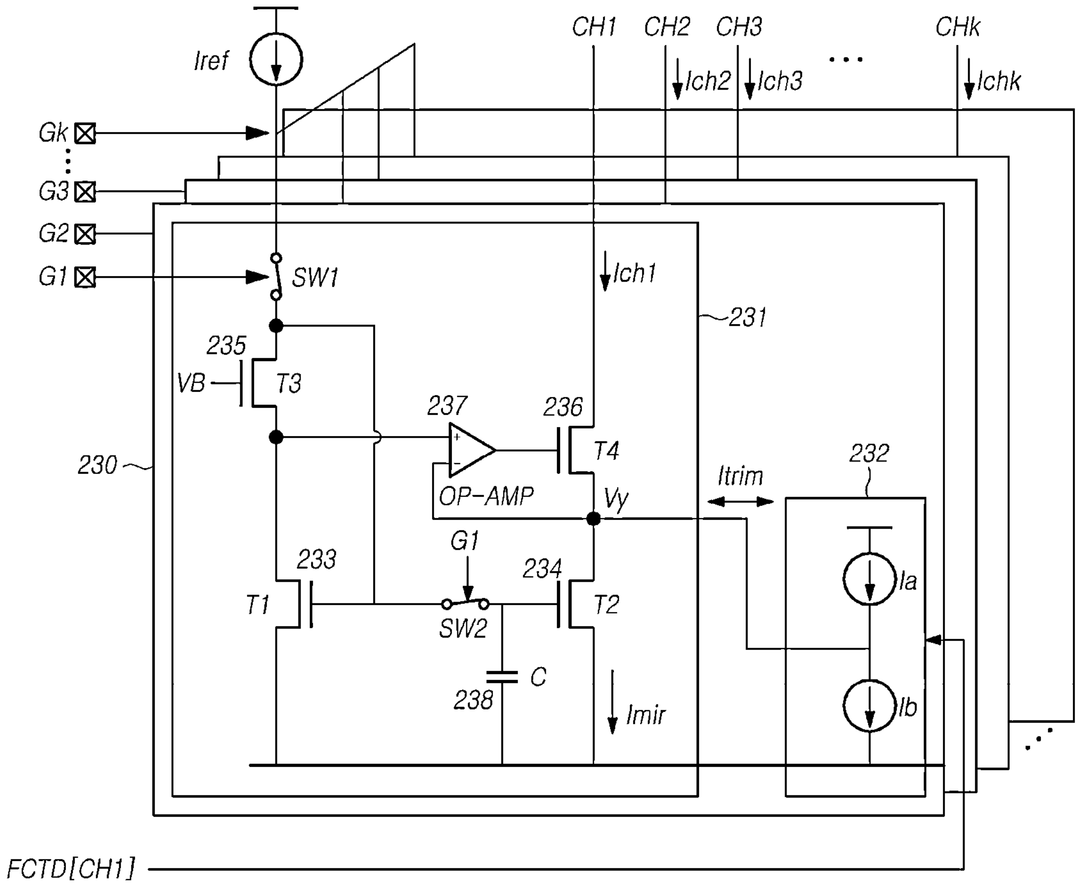
FIG. 12 is a diagram showing one of current control circuits of FIG. 10.
Figure 13:
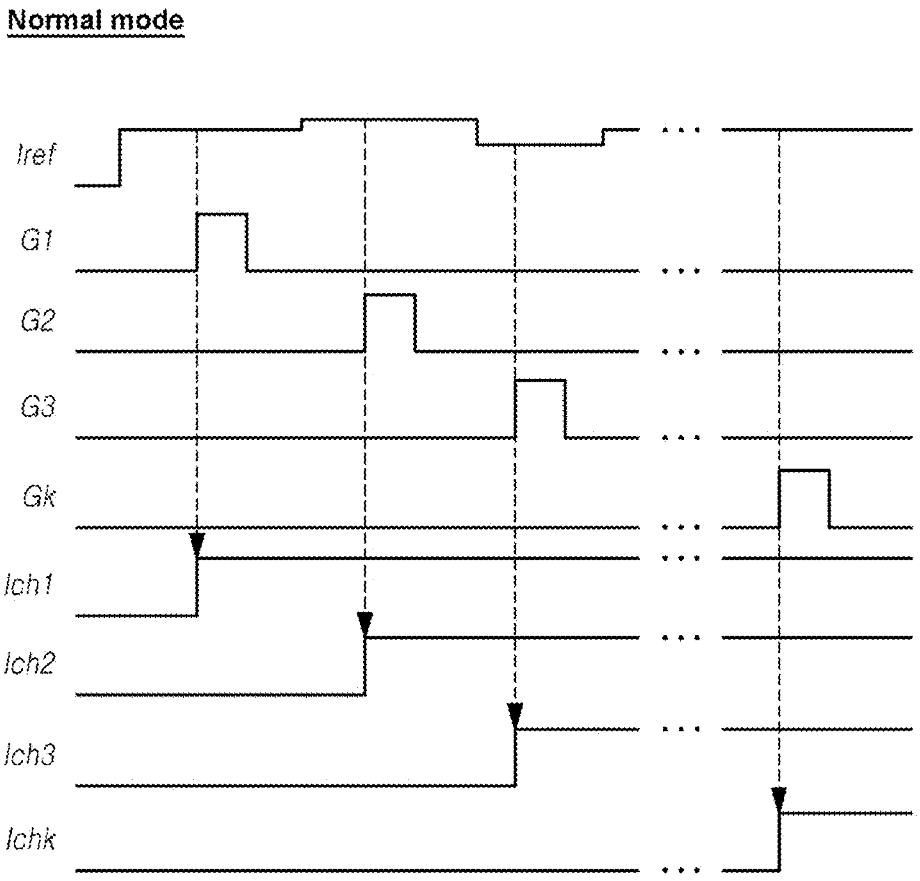
FIG. 13 is a diagram showing an example of an output current of each channel according to common pin input in FIG. 12.

FIG. 12 is a diagram showing one of the current control circuits of FIG. 10. FIG. 13 is a diagram showing an example of an output current of each channel according to common pin input in FIG. 12.

Referring to FIGS. 12 and 13, the constant current driving device 200 according to another embodiment may operate in a normal mode. In this case, the circuit control signal CCS may be applied to the first common pin G1 which is one of the k common pins G1, G2, G3, . . . Gk, and the current control circuit 230 corresponding to the common pin G1 to which the circuit control signal CCS is applied may set the output current.

The memory control circuit 230 may provide an output current Ich1 corresponding to the target current TI to a channel CH1 through a current mirror 231 including first to fourth transistors 233, 234, 235, and 236, an operational amplifier 237, and a capacitor 238, a fine trimming circuit 232 and the like. At this time, the first switch SW1 and the second switch SW2 are switched by the first common pin G1.

When the circuit control signal CCS for selecting the first common pin G1 is generated, the first switch SW1 and the second switch SW2 corresponding to the first common pin G1 are turned on. At this time, since the remaining common pins G2, G3, . . . , Gk are not selected, switches corresponding to the remaining common pins G2, G3, . . . , Gk are turned off. Accordingly, the reference current Iref is applied only to the current control circuit 230.

In addition, a mirroring current Imir is generated based on the reference current Iref, and the same current as the target current TI is supplied to the channel CH1 through the fine trimming circuit 232. At this time, the capacitor 238 is charged by the gate-source voltage of the second transistor 234 according to the reference current Iref. When the second switch SW2 is turned off by the first common pin G1, the voltage charged in the capacitor 238 is maintained, and thus a high-precision constant current can be maintained even if the reference current Iref does not flow through the current mirror 231.

Meanwhile, the reference current is sequentially applied to the current control circuits 230, 240, 250, and 260 through the k common pins G1, G2, G3, . . . , Gk according to the circuit control signal CCS, and thereafter, when cut off, the output currents Ich1, Ich2, Ich3, and Ichk are set in the current control circuits 230, 240, 250 and 260.

Accordingly, the output currents Ich1, Ich2, Ich3, . . . , Ichk can be set in all or some of the k channels CH1, CH2, CH3, . . . , CHk using the circuit control signal CCS input to the k common pins G1, G2, G3, . . . , Gk.

Referring to FIG. 13, the constant current driving device 200 may operate in a normal mode. The common pins G1, G2, G3, and Gk shown in FIG. 13 sequentially become a high level and then immediately become a low level according to the circuit control signal CCS input thereto.

The signals input to the common pins G1, G2, G3, and Gk shown in FIG. 13 set the output currents Ich1, Ich2, Ich3, and Ichk to corresponding channels, respectively.

At this time, the set output currents Ich1, Ich2, Ich3, and Ichk can be maintained as constant currents even if the corresponding common pins G1, G2, G3, and GK become a low level.

Figure 14:
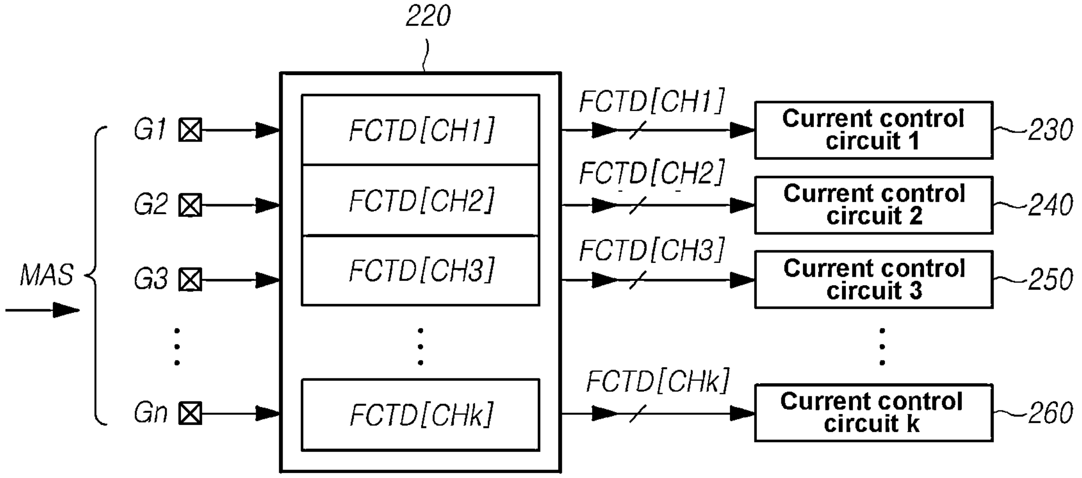
FIG. 14 is a diagram showing a memory, common pins, and fine current trimming data of FIG. 11.

FIG. 14 is a diagram showing the memory, the common pins, and the fine current trimming data of FIG. 11.

Referring to FIG. 14, the constant current driving device 200 according to another embodiment may operate in a memory access mode to write fine current trimming data FCTD[CH1], FCTD[CH2], FCTD[CH3], . . . , FCTD[CHk] respectively corresponding to the k channels CH1, CH2, CH3, . . . , CHk in the memory 220 through a memory access signal MAS input to n common pins G1, G2, G3, . . . , Gn (n being an integer equal to or greater than 1 and equal to or less than k) among the k common pins G1, G2, G3, . . . , Gk.

As a method of writing the fine current trimming data FCTD[CH1], FCTD[CH2], FCTD[CH3], . . . , FCTD[CHk] corresponding to the k channels CH1, CH2, CH3, . . . , CHk in the memory 220, various methods including synchronous communication or asynchronous communication may be used.

If the fine current trimming data FCTD[CH1], FCTD[CH2], FCTD[CH3], . . . , FCTD[CHk] is written in the memory 220 through synchronous communication, a common terminal for transmitting at least a clock signal CLK and a data signal DATA may be required.

If the fine current trimming data FCTD[CH1], FCTD[CH2], FCTD[CH3], . . . , FCTD[CHk] is written in the memory 220 through asynchronous communication, at least one common terminal may be used. At this time, the clock signal CLK is transmitted while being included in the data signal DATA.

At this time, the fine current trimming data FCTD[CH1], FCTD[CH2], FCTD[CH3], . . . , FCTD[CHk] corresponding to the k channels CH1, CH2, CH3, . . . , CHk may be written through the first common pin to the n-th common pin G1, G2, G3, . . . , Gn. The fine current trimming data FCTD[CH1], FCTD[CH2], FCTD[CH3], . . . , FCTD[CHk] corresponding to the k channels stored in the memory 220 may be provided to the current control circuits 230, 240, 250 and 260 and used to trim the output currents Ich1, Ich2, Ich3, . . . , Ichk of the respective channels.

The above-described first to n-th common pins G1, G2, G3, . . . , Gn are examples for describing the invention, and the memory access signal MAS for accessing the memory 220 may be input to the memory 220 through fewer or more common pins than those shown in FIG. 14.

Figure 15:
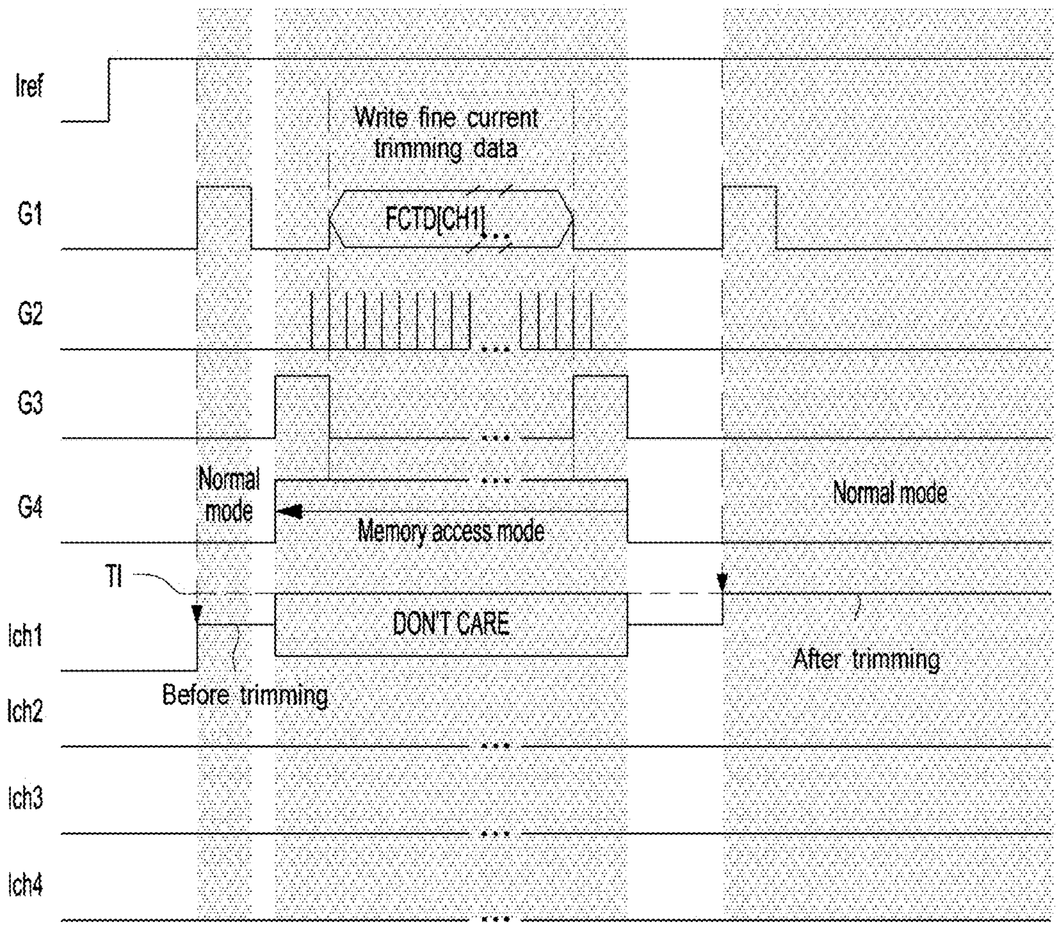
FIG. 15 is a diagram showing an example of an output current of each channel according to common pin input in FIG. 12.
Figure 16:
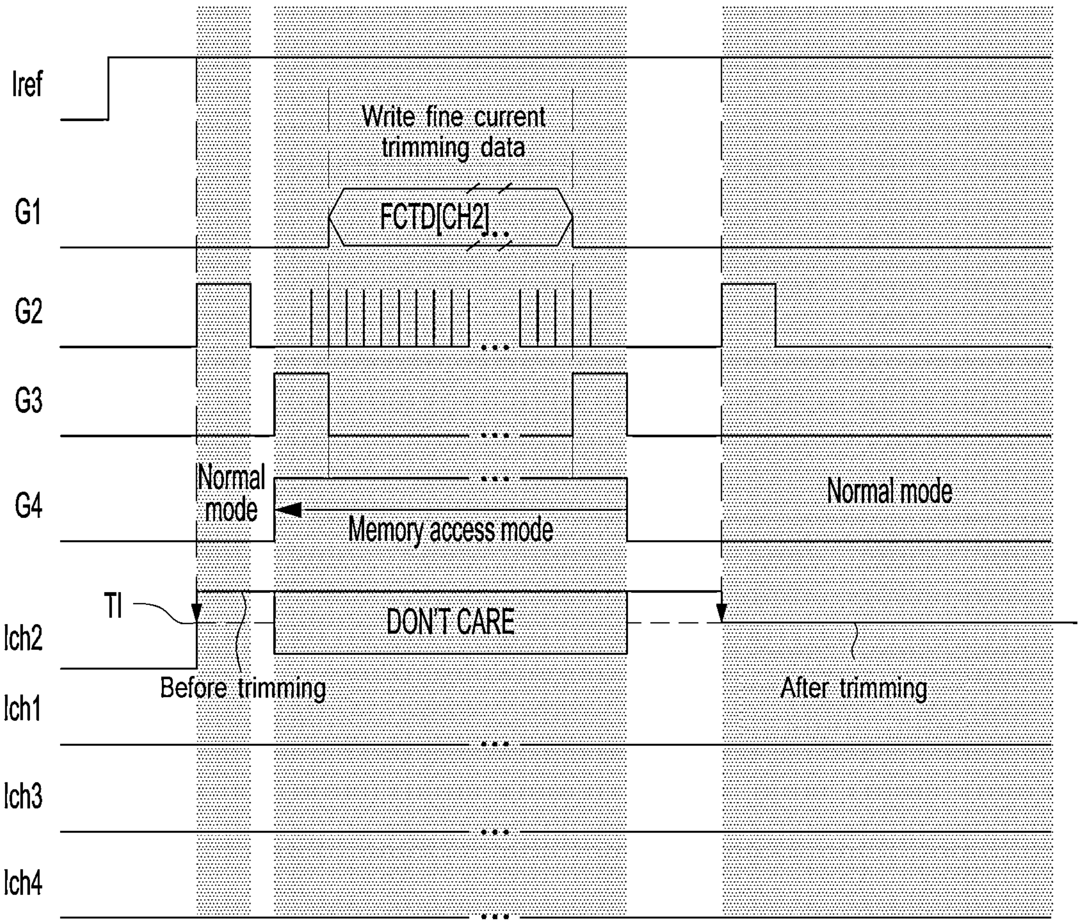
FIG. 16 is a diagram showing another example of the output current of each channel according to common pin input of FIG. 12.

FIG. 15 is a diagram showing an example of the output current of each channel according to common pin input of FIG. 12. FIG. 16 is a diagram showing another example of the output current of each channel according to common pin input of FIG. 12.

Referring to FIGS. 15 and 16, the k common pins G1, G2, G3, . . . , Gk may include first to fourth common pins G1, G2, G3, and G4. The data signal DATA may be input to the first common pin G1, the clock signal CLK may be input to the second common pin G2, a start and end flag signal FLG may be input to the third common pin G3, and a write enable signal EN may be input to the fourth common pin G4.

In FIG. 15, the constant current driving device 200 may operate in the normal mode. At this time, the output current Ich1 of the first channel CH1 corresponding to the first common pin G1 is set by the circuit control signal CCS. Since the output current Ich1 is in a state before trimming and thus may be different from the target current TI. In FIG. 15, the output current Ich1 of the first channel CH1 before trimming is less than the target current TI. As described above, the fine current trimming data FCTD[CH1] corresponding to the first channel CH1 for increasing the amount of current corresponding to the difference between the output current Ich1 of the first channel CH1 and the target current TI may be determined.

Thereafter, the constant current driving device 200 may operate in the memory access mode to write the fine current trimming data FCTD[CH1] corresponding to the first channel CH1 in the memory 220. First, the flag signal FLG and the write enable signal EN at a high level are simultaneously input to the third common pin G3 and the fourth common pin G4 when the memory access mode starts. The memory 220 may prepare to receive data based on transition of the flag signal FLG and the write enable signal EN to the high level.

At this time, the clock signal CLK is input to the second common pin, and then the data signal DATA is input to the first common pin G1 at a falling edge of the flag signal FLG. The fine current trimming data FCTD[CH1] corresponding to the first channel CH1 can be written in the memory 220 by the data signal DATA input to the first common pin and the clock signal CLK input to the second common pin.

Meanwhile, when the fine current trimming data FCTD[CH1] is transmitted to the memory 220 through the first common pin G1 and the second common pin G2, the output current Ich1 of the first channel CH1 can be ignored.

After data writing, data writing through the data signal DATA input to the first common pin G1 can be terminated upon generation of a rising edge of the flag signal FLG input to the third common pin G3.

Thereafter, the flag signal FLG input to the third common pin G3 and the write enable signal EN input to the fourth common pin G4 become a low level and thus the memory access mode is terminated. Accordingly, the fine current trimming data FCTD[CH1] corresponding to the first channel CH1 is stored in the memory 220.

The current control circuit 230 may load the fine current trimming data FCTD[CH1] corresponding to the first channel CH1 stored in the memory 220, increase the current Ich1 to the target current TI and provide the same to the first channel CH1 in the normal mode. If the adjusted output current Ich1 is different from the target current, the process may be repeated until the adjusted output current Ich1 becomes equal to the target current.

After fine current trimming for the first channel CH1 is finished, fine current trimming for the second channel CH2 may be performed.

FIG. 16 shows current trimming for the second channel CH2 after current trimming for the first channel CH1, and as shown in FIG. 16, the output current Ich2 of the second channel CH2 corresponding to the second common pin G2 is set according to the circuit control signal CCS. The output current Ich2 is in a state before trimming and thus has a difference from the target current TI. In FIG. 16, the output current Ich2 of the second channel CH2 is greater than the target current TI. As described above, the fine current trimming data FCTD[CH2] corresponding to the second channel CH2 for reducing the amount of current corresponding to the difference between the output current Ich2 of the second channel CH2 and the target current TI can be determined.

Thereafter, the constant current driving device 200 may operate in the memory access mode to write the fine current trimming data FCTD[CH2] corresponding to the second channel CH2 in the memory 220. First, the flag signal FLG and the write enable signal EN at a high level are simultaneously input to the third common pin G3 and the fourth common pin G4 when the memory access mode starts. The memory 220 may prepare to receive data based on transition of the flag signal FLG and the write enable signal EN to the high level.

At this time, the clock signal CLK is input to the second common pin, and then the data signal DATA is inputted to the first common pin G1 at a falling edge of the flag signal FLG. The fine current trimming data FCTD[CH2] corresponding to the second channel CH2 can be written in the memory 220 by the data signal DATA input to the first common pin and the clock signal CLK input to the second common pin.

Meanwhile, when the fine current trimming data FCTD[CH2] is transmitted to the memory 220 through the first common pin G1 and the second common pin G2, the output current Ich2 of the second channel CH2 can be ignored.

After data writing, data writing through the data signal DATA input to the first common pin G1 can be terminated upon generation of a rising edge of the flag signal FLG input to the third common pin G3.

Thereafter, the flag signal FLG input to the third common pin G3 and the write enable signal EN input to the fourth common pin become a low level, and the memory access mode is terminated. Accordingly, the fine current trimming data FCTD[CH2] corresponding to the second channel CH2 is stored in the memory 220.

The current control circuit 240 may load the fine current trimming data FCTD[CH2] corresponding to the second channel CH2 stored in the memory 220, reduce the current Ich2 to the target current TI, and transmit the reduced current Ich2 to the second channel CH2 in the normal mode. If the adjusted output current Ich2 of the second channel is different from the target current, the process may be repeated until the adjusted output current Ich2 of the second channel becomes equal to the target current.

After fine current trimming for the second channel CH2 is finished, fine current trimming may be performed for the remaining channels CH3, . . . , CHk.

Figure 17:
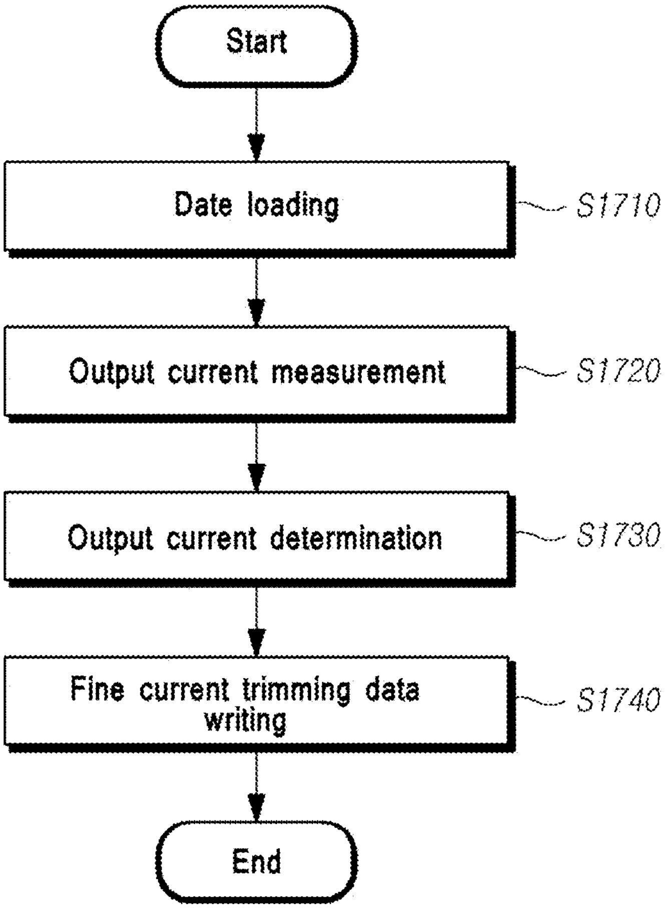
FIG. 17 is a diagram showing an example of a fine current trimming method of the constant current driving device according to another embodiment.

FIG. 17 is a diagram showing an example of a fine current trimming method of the constant current driving device according to an embodiment.

Referring to FIG. 17, the fine current trimming method of the constant current driving device 100 may include a data loading step S1710 of loading fine current trimming data FCTD stored in the memory 120 to the current control circuit 130, an output current measurement step S1720 of measuring an output current Io based on the fine current trimming data FCTD, an output current determination step S1730 of determining whether the output current Io is equal to a target current, and a fine current trimming data writing step S1740 of writing fine current trimming data FCTD calculated from a difference between the target current TI and the output current in the memory 120 if the output current Io is not equal to the target current TI.

In the data loading step S1710, the fine current trimming data FCTD is transmitted from the memory 120 to the fine trimming circuit 132 included in the current control circuit 130. The current control circuit 130 may trim the output current Io based on the fine current trimming data FCTD. In this case, initial fine current trimming data FCTD may be set such that it is not used to trim the output current Io or may be set to a specific default value.

In the output current measurement step S1720, the output current Io may be measured through a separate current measurement device.

In the output current determination step S1730, the output current Io measured in the output current measurement step S1720 is compared to the target current TI and it is determined whether the output current Io is substantially the same as the target current TI.

In the fine current trimming data writing step S1740, the fine current trimming data FCTD may be written in the memory 120 through the memory access signal MAS. Accordingly, the fine current trimming data FCTD for trimming the measured output current Io may be stored in the memory 120. In addition, it is possible to provide the constant current driving device 100 that maintains a constant output current Io through the fine current trimming method and provides a high-precision constant current regardless of the real-time operation of a load and device characteristics of the load and a current control circuit at the time of product shipment.

In addition, the fine current trimming method of the constant current driving device 100 may repeat the fine current trimming data writing step S1740, the fine current trimming data loading step S1710, the output current measurement step S1720, and the output current determination step S1730 until the output current Io becomes equal to the target current.

Accordingly, even if trimming of the output current Io fails, it is possible to additionally trim the output current Io.

Figure 18:
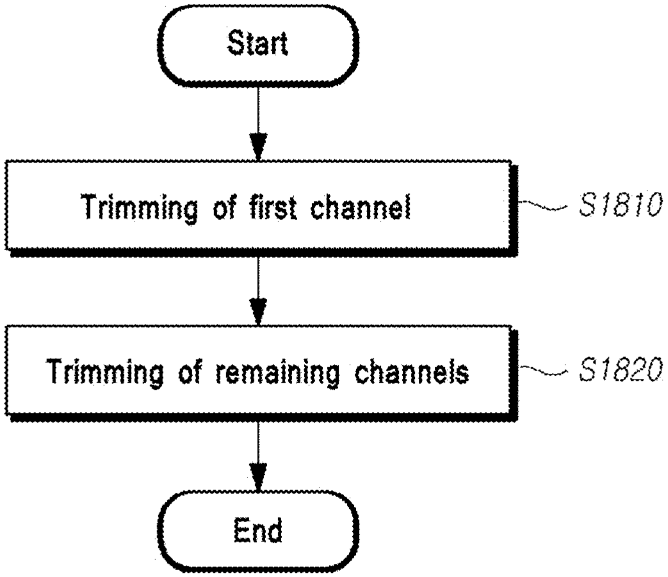
FIG. 18 is a diagram showing another example of a fine current trimming method of the constant current driving device according to another embodiment.

FIG. 18 is a diagram showing another example of a fine current trimming method of the constant current driving device according to another embodiment.

Referring to FIG. 18, the fine current trimming method of the constant current driving device 200 for supplying a constant current to k channels may include a first channel trimming step S1810 of deciding fine current trimming data FCTD for one channel and completing fine trimming, and a remaining channel trimming step S1820 of sequentially performing fine current trimming on other channels for which fine current trimming has not been completed.

In this case, it is possible to provide the constant current driving device 200 for reducing a constant current deviation between the k channels through the fine current trimming method at the time of product shipment.

Through the above-described embodiments, it is possible to provide a constant current driving device and a current trimming method thereof for providing a constant current by trimming an output current using fine current trimming data stored in a memory.

As described above, the constant current driving device and the current trimming method thereof according to the present embodiment can supply a high-precision constant current by trimming an output current based on fine current trimming data stored in a memory.

What is claimed is:

1. A constant current driving device comprising:

a reference current source configured to supply a reference current;

a memory configured to store fine current trimming data determined by a difference between a target current and an output current before trimming through a memory access signal; and a current control circuit configured to be controlled through a circuit control signal, to generate an output current corresponding to the reference current, and to supply to a channel an output current trimmed based on the fine current trimming data stored in the memory.

2. The constant current driving device of claim 1, wherein the current control circuit comprises a current mirror configured to receive the reference current and to generate a mirroring current, and a fine trimming circuit configured to trim the mirroring current based on the fine current trimming data received from the memory.

3. The constant current driving device of claim 2, wherein the current mirror comprises a first switch configured to apply the reference current, a first transistor connected in series with the first switch and having a gate to which the reference current is applied, a second transistor having a gate connected to the gate of the first transistor, a second switch disposed between the gate of the first transistor and the gate of the second transistor, and a capacitor connected between the second switch and the gate of the second transistor, wherein the first switch and the second switch are controlled by the circuit control signal and the second transistor supplies the output current to the channel.

4. The constant current driving device of claim 3, wherein the current mirror additionally comprises a third transistor disposed between the first switch and the first transistor, a fourth transistor connected in series with the second transistor on a side of a channel, and an operational amplifier configured to receive a voltage generated between the first transistor and the third transistor and a voltage generated between the second transistor and the fourth transistor and to output the voltages to a gate of the fourth transistor.

5. The constant current driving device of claim 2, wherein the fine trimming circuit comprises a first variable current source and a second variable current source and trims the mirroring current by adjusting a current of the first variable current source and a current of the second variable current source based on the fine current trimming data.

6. The constant current driving device of claim 5, wherein the first variable current source and the second variable current source are digitally controlled and the fine current trimming data is digital code for controlling the first variable current source and the second variable current source.

7. The constant current driving device of claim 1, wherein the memory access signal comprises a data signal, a clock signal, a flag signal indicating a start and an end, and an enable signal.

8. The constant current driving device of claim 1, wherein there are k current control circuits corresponding to k channels (k being a natural number equal to or greater than 2) and the memory stores fine current trimming data corresponding to each of the k channels.

9. The constant current driving device of claim 8, wherein the memory access signal and the circuit control signal are input through all or some of k common pins corresponding to the k channels.

10. The constant current driving device of claim 9, wherein the constant current driving device operates in a normal mode such that the circuit control signal is applied to one of the k common pins and a current control circuit corresponding to the common pin, to which the circuit control signal is applied, sets an output current.

11. The constant current driving device of claim 10, wherein the constant current driving device operates in a memory access mode to write fine current trimming data corresponding to each of the k channels in the memory through the memory access signal input to n common pins (n being an integer equal to or greater than 1 and equal to or less than k) among the k common pins.

12. The constant current driving device of claim 11, wherein the k common pins comprise first to fourth common pins, wherein a data signal is input to the first common pin, a clock signal is input to the second common pin, a start and end flag signal is input to the third common pin, and a write enable signal is input to the fourth common pin.

13. A fine current trimming method of a constant current driving device, comprising:

loading fine current trimming data stored in a memory to a current control circuit;

measuring an output current output to a channel based on the fine current trimming data;

determining whether the output current is equal to a target current; and writing fine current trimming data determined by a difference between the target current and the output current in the memory if the output current is not equal to the target current.

14. The fine current trimming method of claim 13, wherein the fine current trimming data writing, the data loading, the output current measurement, and the output current determination are repeated until the output current becomes equal to the target current.

15. The fine current trimming method of claim 14, further comprising:

a trimming of a first channel in which fine current trimming data is decided for a first channel among k channels (k being a natural number equal to or greater than 2) so as to complete fine current trimming; and trimmings of remaining channels in which fine current trimmings are sequentially performed on other channels for which the fine current trimming is not completed among the k channels.

16. A light emitting diode (LED) driving device comprising:

a reference current source configured to supply a reference current;

a memory configured to store fine current trimming data determined by a difference between a target current and an output current before trimming; and a current control circuit configured to generate an output current corresponding to the reference current and to supply an output current, trimmed based on the fine current trimming data stored in the memory, to a channel in which a light emitting diode (LED) is disposed.

17. The LED driving device of claim 16, wherein the memory comprises a non-volatile memory device and the fine current trimming data is stored in the non-volatile memory device.

18. The LED driving device of claim 16, wherein the current control circuit supplies the output current to the channel in a time period in which a circuit control signal is applied.

19. The LED driving device of claim 16, wherein at least one LED is disposed in each of two different channels, the LEDs disposed in the different channels having different characteristics.

20. The LED driving device of claim 16, wherein the current control circuit comprises at least one digital variable current source controlled according to digital code corresponding to the fine current trimming data.

* * * * *